(12) United States Patent
Kulinsky et al.

(10) Patent No.: US 10,166,541 B2
(45) Date of Patent: Jan. 1, 2019

(54) CENTRIFUGAL MICROFLUIDIC PLATFORM FOR AUTOMATED MEDIA EXCHANGE

(71) Applicant: THE REGENTS OF THE UNIVERSITY OF CALIFORNIA, Oakland, CA (US)

(72) Inventors: Lawrence Kulinsky, Los Angeles, CA (US); Ling Kong, San Francisco, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 380 days.

(21) Appl. No.: 14/964,190

(22) Filed: Dec. 9, 2015

(65) Prior Publication Data

US 2016/0167045 A1    Jun. 16, 2016

Related U.S. Application Data

(60) Provisional application No. 62/090,282, filed on Dec. 10, 2014.

(51) Int. Cl.
*B01L 3/00* (2006.01)
*B01D 21/26* (2006.01)

(52) U.S. Cl.
CPC ........ *B01L 3/50273* (2013.01); *B01D 21/262* (2013.01); *B01L 2200/0668* (2013.01);
(Continued)

(58) Field of Classification Search
CPC ......... B01L 3/50273; B01L 2300/0864; B01L 2300/867; B01L 2300/0681;
(Continued)

(56) References Cited

U.S. PATENT DOCUMENTS 4,696,902 A    9/1987  Bisconte
6,143,248 A *  11/2000  Kellogg ................. B01F 13/00
                                           422/503
(Continued)

FOREIGN PATENT DOCUMENTS

KR    20130080307 A  *  7/2013  .............. C12N 1/08

OTHER PUBLICATIONS

Siegrist J et al. "Validation of a centrifugal microfluidic sample lysis and homogenization platform for nucleic acid extraction with clinical samples", Lab on a Chip. 2010; 10:363-371.
(Continued)

*Primary Examiner* — Walter D. Griffin
*Assistant Examiner* — Shuyi S. Liu
(74) *Attorney, Agent, or Firm* — Vista IP Law Group LLP

(57) ABSTRACT

A microfluidic device and method comprises a rotatable substrate configured to be rotated at various angular velocities in order to accomplish a series of media exchanges with a sample chamber for containing a sample. A plurality of media reservoirs and waste reservoirs are connected to the sample chamber via channels forming capillary valves in which the capillary valves have varying burst frequencies of rotation of the substrate. The substrate can then be rotated through a series of angular velocities to automate media exchanges between the sample chamber and the respective media reservoirs and waste reservoirs. A pair of media reservoirs are located radially inward of the sample chamber and a pair of waste reservoirs are located radially outward of the sample chamber in an "X" configuration such that centrifugal forces cause fluid media to open the capillary valves and flow among the sample chamber, media reservoirs and waste reservoirs.

23 Claims, 7 Drawing Sheets

(52) U.S. Cl.
CPC .......... *B01L 2300/0681* (2013.01); *B01L 2300/0806* (2013.01); *B01L 2300/0864* (2013.01); *B01L 2300/0867* (2013.01); *B01L 2300/0883* (2013.01); *B01L 2300/0887* (2013.01); *B01L 2400/0409* (2013.01); *B01L 2400/0688* (2013.01)

(58) Field of Classification Search
CPC ..... B01L 2300/0887; B01L 2300/0806; B01L 2300/0883; B01L 2200/0668; B01L 2400/0688; B01D 21/262
USPC .............................................. 494/37; 422/506
See application file for complete search history.

(56) References Cited

U.S. PATENT DOCUMENTS

| | | | |
|---|---|---|---|
| 6,673,595 B2 | 1/2004 | Barbera-Guillem | |
| 7,635,575 B2 | 12/2009 | Scherze et al. | |
| 8,101,138 B2 | 1/2012 | Lee et al. | |
| 8,303,911 B2 | 11/2012 | Siegrist et al. | |
| 8,534,319 B2* | 9/2013 | Bergeron | B01L 3/502738 137/151 |
| 2002/0106786 A1* | 8/2002 | Carvalho | B01F 5/0647 435/287.3 |
| 2008/0110500 A1 | 5/2008 | Kido et al. | |
| 2008/0190503 A1 | 8/2008 | Zoval et al. | |
| 2009/0221431 A1 | 9/2009 | Yoo | |
| 2010/0135859 A1 | 6/2010 | Sa | |
| 2012/0241035 A1* | 9/2012 | Shih | B01L 3/502738 137/861 |
| 2012/0295781 A1 | 11/2012 | Amasia et al. | |
| 2013/0171697 A1* | 7/2013 | Park | C12N 1/08 435/91.2 |

OTHER PUBLICATIONS

Thio, G. et al., "Theoretical Development and Critical Analysis of Burst Frequency Equations for Passive Valves on Centrifugal Microfluidic Platforms", Medical & Biological Engineering & Computing (2013).

* cited by examiner

CENTRIFUGAL MICROFLUIDIC PLATFORM FOR AUTOMATED MEDIA EXCHANGE

RELATED APPLICATION

This Application claims the benefit of U.S. provisional Application No. 62/090,282, filed on Dec. 10, 2014, in accordance with 35 U.S.C. Section 119(e), and any other applicable laws. The contents of the aforementioned application(s) are hereby incorporated herein by reference in their entirety as if set forth fully herein.

FIELD OF THE INVENTION

The field of the invention generally relates to centrifugal microfluidic devices, and more specifically to a centrifugal microfluidic device for inserting and removing a plurality of media in a sample chamber containing a sample, such as a sample including biological cells.

BACKGROUND

Centrifugal microfluidic platforms are known for various fluidic techniques and operations such as volume definition, valving, and nucleic acid sample preparation. These known techniques were developed for performing chemical and biological assays on compact fluidic disc (CD or Lab-on-Disc) platforms. For instance, a number of examples are described in U.S. Patent Appn. Publ. No. 2009-0221431 and U.S. Pat. Nos. 8,303,911, 8,101,138. However, previously disclosed centrifugal microfluidic platforms were not designed to perform processes having multiple media exchanges, such as those processes utilized in cell growth procedures.

Large scale automated media exchange systems are known that utilize bulky equipment such as external pumps and/or robots for pipetting and aspiration of media into and out of cell containing reservoirs. Several examples are described in U.S. Pat. Nos. 6,673,595, 7,635,575, and 4,696,902. These large scale technologies cannot be easily miniaturized for use in small scale cell culture to fit within small incubators. For most of the smaller scale processes, including in-vitro fertilization carried out in incubators, media exchange is done manually using hand-held pipettes and placing embryos in a dish with a specific media for a specified period of time. At the time of the prescribed change of media, the cells are manually aspirated from the dish and placed into a separate dish with a different type of media. This process involving manual embryo handling is stressful for embryos and can be detrimental to optimal normal cell development. Presently, there are no automated media exchange solutions that can fit inside a bench top incubator.

SUMMARY

In one aspect, the invention described herein unifies storage of media, secure containment of cells, automated opening of fluidic valves, and fluid propulsion on a compact disc device that is rotated with a compact rotor that can fit within a portable incubator and that can be manufactured and/or machined inexpensively from biocompatible plastic via milling, injection molding and/or similar fabrication techniques. The platform presented in this invention allows for automated media exchange that avoids manual cell handling during media exchange processes thus reducing stress on a sample, such as biological cells, thereby maintaining the quality of the sample, including the health and viability of a sample.

Additionally the use of a centrifugal microfluidic platform that unifies media storage, secure confinement of the sample, robust valving, and media propulsion onto a single compact disc allows for a compact automated media exchange solution that can fit into a typical desktop incubator with minimal modifications, such as installing or integrating a disc drive in the incubator.

In order to culture cells, including in processes such as in-vitro fertilization, cells are placed sequentially in various media at specified time intervals. In order to prevent operator errors and reduce handling processes that are detrimental to the health of the cells, an automated media exchange platform is provided based on the principles of centrifugal microfluidics. The fabricated substrate (e.g., a compact disc) contains a network of media filled reservoirs and waste reservoirs connected to the sample chamber by microfluidic channels. The microfluidic device and methods of the present invention allow the cells to stay in the same chamber while different media flow through the cell-containing chamber, staying in the chamber for the prescribed duration of time. The temporal control of the movement of various media through the system is accomplished via opening of valves connecting the media storage reservoirs to the sample chamber (e.g., containing cells) and valves connecting the sample chamber to the waste-collecting reservoirs. The movement of the various fluids is controlled by the angular velocity of the disc (also referred to as a "substrate"). The cross-section and distance of the different fluidic channels from the axis of rotation of the substrate or disc determines the burst frequency at which a capillary valve formed by each fluid channel connected to a respective reservoir opens. The present invention also allows for the control of the media flow rate through the channels and across a sample (e.g., cells) in the sample chamber.

Accordingly, in one embodiment, the present invention is directed to a microfluidic device configured to be rotated at various angular velocities in order to accomplish a series of media exchanges with a sample chamber for containing a sample, such as biological cells. Although the present invention is generally described herein in connection with a sample containing cells, the present invention is not limited to devices and methods for a cell sample, but may be configured and used with any compatible sample, including any suitable chemical, biochemical or other sample material. The microfluidic device comprises a substrate configured for being rotated about an axis of rotation. For example, the substrate may be in the form of a compact disc ("CD"), or any other suitable platform. The substrate has a media exchange module formed in the substrate.

The media exchange module comprises a plurality of microfluidic features formed in the substrate. In particular, the media exchange module includes a sample chamber for containing a sample. A first waste reservoir is located radially outward of the sample chamber. The first waste reservoir is connected to the sample chamber via a first channel. The first channel forms a first capillary valve having a configuration (e.g., cross-section and radial position) which provides a first burst frequency for the first capillary valve. As used herein, the term "burst frequency" means the maximum angular velocity of the substrate rotating about its axis of rotation at which a respective capillary valve prevents flow of media through the capillary valve and at angular velocities exceeding such maximum angular velocity the capillary valve allows flow of media through the capillary valve. The first waste reservoir is typically empty at the start of a process utilizing the microfluidic device.

A first media reservoir is located radially inward of the sample chamber and is connected to the sample chamber via a second channel. The second channel forms a second capillary valve having a second burst frequency which is greater than the first burst frequency. Accordingly, when the substrate is rotated at an angular velocity which is greater than the first burst frequency but less than the second burst frequency, the first capillary valve will open, thereby allowing fluid, such as an initial media, within the sample chamber to flow out of the sample chamber into the first waste reservoir, while the second capillary valve continues to seal the second channel which prevents media from flowing out of the first media reservoir.

A second waste reservoir is located radially outward of the sample chamber and is connected to the sample chamber via a third channel. The third channel forms a third capillary valve having a third burst frequency which is greater than the second burst frequency. In addition, a second media reservoir is located radially inward of the sample chamber and is connected to the sample chamber via a fourth channel. The fourth channel forms a fourth capillary valve having a fourth burst frequency which is greater than the third burst frequency.

In another aspect of the invention, the media exchange module of the microfluidic device is in an "X" configuration. The first media reservoir and second media reservoir are at substantially the same radial distance from the axis of rotation (radially inward of the sample chamber) and adjacent to each other. Similarly, the first waste reservoir and second waste reservoir are at substantially the same radial distance from the axis of rotation (radially outward of the sample chamber) and adjacent to each other. The sample chamber is located between the first media reservoir, second media reservoir, first waste reservoir and second waste reservoir. Accordingly, the microfluidic features form an "X" shape.

In still another aspect of the present invention, the volume of the first waste reservoir is substantially the same as the volume of the sample chamber. In this way, when an initial media within the sample chamber is evacuated into the first waste reservoir, the initial media will substantially fill the entire volume of the first waste reservoir such that when the substrate is rotated at angular velocities greater than the first burst frequency (e.g., angular velocities greater than the second burst frequency at which a first media flows out of the first media reservoir into the sample chamber), media within the sample reservoir will not flow into the first waste reservoir because it is already full.

In yet another aspect of the microfluidic device, the substrate comprises a circular compact disc formed of a plurality of separate layers which form the media exchange module.

In another aspect of the invention, the microfluidic device further comprises a disc drive. The disc drive includes a spin motor coupled to a support for retaining the substrate. The disc drive is configured to rotate the substrate about the axis of rotation at a controllable angular velocity. The device further comprises a table top incubator which encloses the entire substrate. The disc drive may also be fully or partially enclosed within the incubator.

In still another feature, the disc drive may be computer-controlled such that the operation of the disc drive can be programmed into the computer in order to control the operating parameters of the disc drive, such as controlling the angular velocity, duration of rotation at a particular angular velocity, acceleration/deceleration of changes in angular velocity, stop periods, etc. The computer may be integral to the disc drive, or it may be a separate component operably connected to the disc drive.

In still another aspect of the microfluidic device, the sample chamber is configured to hold a cell sample and to retain the cell sample in the sample chamber during transfers of media from the sample chamber to one or more of the first waste reservoir and the second waste reservoir. For example, the sample chamber may comprise a cell retainer which retains one or more cells within the sample chamber during transfers of media from the sample chamber to one or more of the first waste reservoir and the second waste reservoir. As an example, the cell retainer may comprise a perforated wall within the sample chamber having a plurality of perforations which are smaller than the diameter of a cell to be placed in the sample chamber.

In still another aspect of the microfluidic device of the present invention, the substrate comprises a plurality of the media exchange modules formed in the substrate. The media exchange modules are angularly spaced apart about the substrate.

In yet another aspect of the present invention, the flow rate of the various media through the channels is controlled by the design of the channels, such as the cross-section, position on the substrate, and length of the channel. For example, one or more of the first channel, second channel, third channel, and fourth channel may extend in a zigzag path having a plurality of acute angled direction changes, such as at least 5 zigzags or at least 7 zigzags, or at least 10 zigzags, or more.

In another embodiment, the present invention is directed to a method of using the microfluidic device described above to perform a series of media exchanges with a sample contained in the sample chamber. First, the substrate is loaded with a sample, initial media, first media and second media. For example, the sample may be one or more cells, and the media may be any suitable reagents for performing the desired process using the microfluidic device. Accordingly, a sample is introduced into the sample chamber. Initial media is also introduced into the sample chamber. A first media is introduced into the first media reservoir and a second media is introduced into the second media reservoir. The substrate is now loaded and ready to perform the media exchanges.

The substrate is mounted on a disc drive configured to rotate the substrate about its axis of rotation. Prior to any of the media exchanges, the substrate may be rotated at a slow angular velocity less than the first burst frequency, including being stationary, while the sample is in contact with the initial media for a prescribed period of time. After the prescribed period of time, the substrate is rotated at a first angular velocity which is greater than the first burst frequency and less than the second burst frequency such that the initial media flows out of the sample chamber into the first waste reservoir via the first channel. The substrate is then rotated at a second angular velocity which is greater than the second burst frequency and less than the third burst frequency such that the first media flows from the first media reservoir into the sample chamber via the second channel. Next, the substrate is rotated at a third angular velocity which is greater than the third burst frequency and less than the fourth burst frequency such that the first media flows from the sample chamber into the second waste reservoir via the third channel. Then, the substrate is rotated at a fourth angular velocity which is greater than the fourth burst frequency such that the second media flows from the second media reservoir into the sample chamber via the fourth channel.

In another aspect of the method of using the microfluidic device, the angular velocity of the substrate is reduced between the steps of inserting and removing the media into and out of the sample chamber. The angular velocity can be reduced to a much slower velocity (e.g., substantially lower than the first burst frequency), or it can be completely stopped. This can help reduce the centrifugal forces acting on the sample, and also helps prevent media from inadvertently flowing between the sample chamber and respective reservoirs because at a low angular velocity the capillary valves formed by the channels block flow of media through the channels.

The method of using the microfluidic device may also include any of the additional aspects and features of the microfluidic device, as described herein. For instance, the media exchange module may include a cell retainer, the device may include a disc drive and/or incubator, computer control, etc.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant.

DETAILED DESCRIPTION OF ILLUSTRATED EMBODIMENTS

Figure 1:
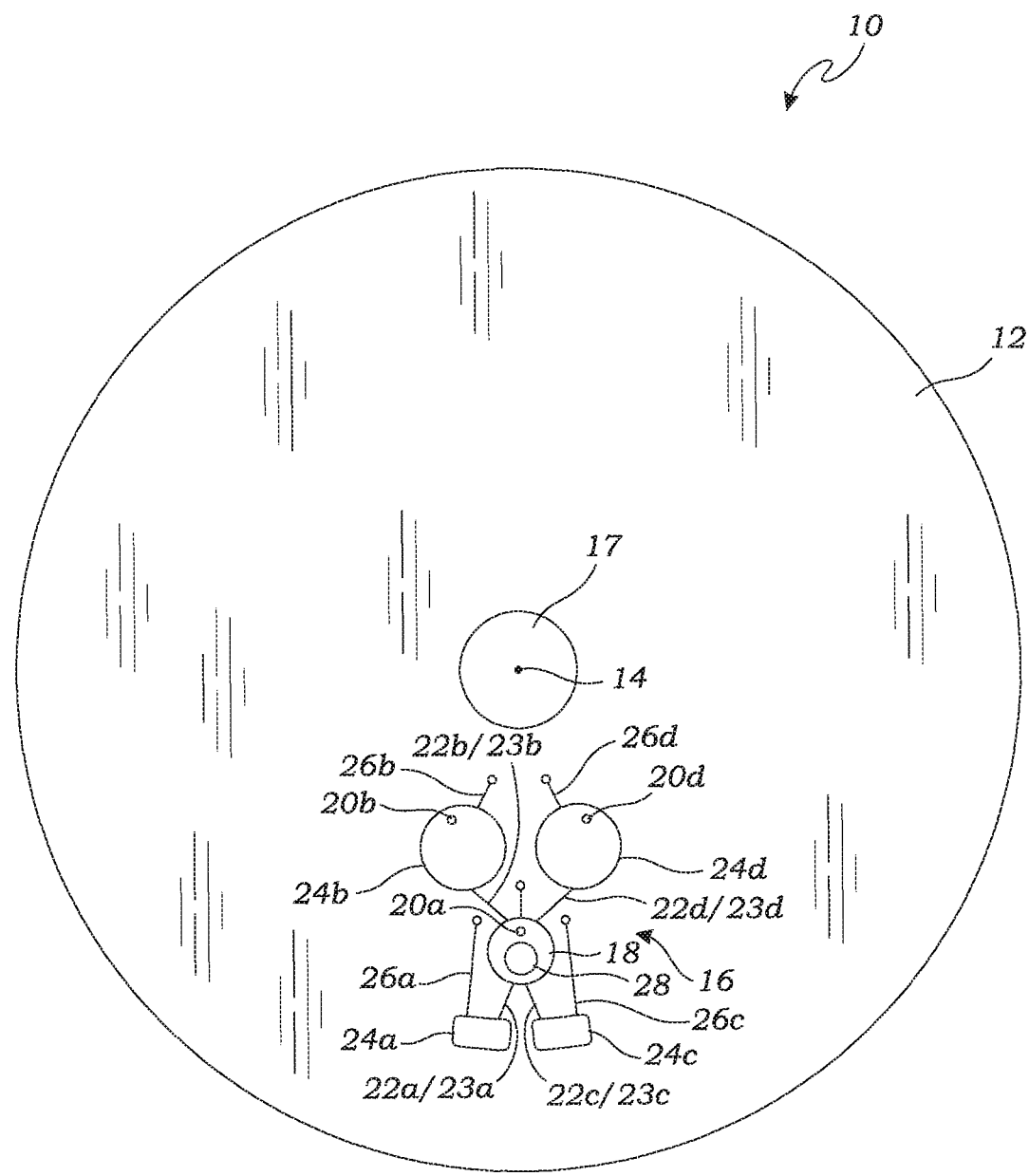
FIG. 1 is a plan view of a microfluidic device comprising a substrate having a media exchange module formed therein, according to one embodiment of the present invention.
Figure 2:
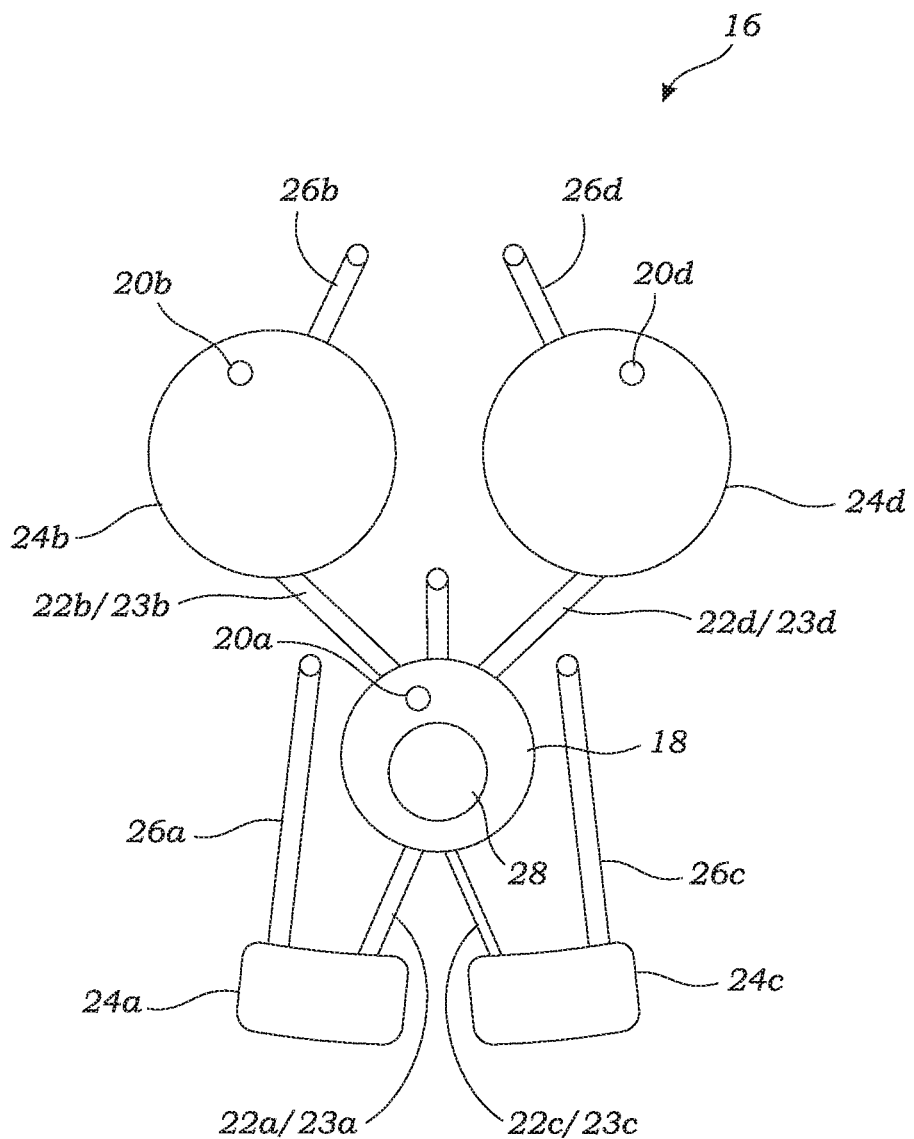
FIG. 2 illustrates a schematic of the media exchange module of FIG. 1.

Referring to FIGS. 1 and 2, one embodiment of a microfluidic device 10 according to the present invention is shown. In this embodiment, the microfluidic device 10 comprises a substrate 12 which is generally circular in shape in the form of a compact disc (CD). It is understood that the substrate 12 may have any suitable shape, such as a square, ellipse, polygon, etc. and is not limited to a circular shape. The substrate 12 may be formed of any suitable material(s), such as polymers, like polycarbonate, PDMS, etc., metals, polymer films, etc. For certain applications, the material(s) should be compatible with the types of samples and media utilized with the microfluidic device 10. For instance, when using cell samples as described below, the substrate 12 should be formed of biocompatible materials. The substrate 12 is rotatable about an axis of rotation 14 at the center of the circular disc. The substrate 12 also includes a hole 17 which can be received on a spindle of a disc drive in order to rotate the microfluidic device 10, as described in more detail below.

The microfluidic device 10 comprises a media exchange module (or unit) 16 which is formed in the substrate 12. The media exchange module 16 comprises a plurality of microfluidic features formed in the substrate 12, including a sample chamber 18, channels 22, valves 23, ports 20, reservoirs 24 and vents 26. In this embodiment, the media exchange module 12 includes a sample chamber 18 for containing a sample introduced into the sample chamber 18. The sample chamber 18 has an inlet port 20a for loading a sample into the sample chamber 18. The sample chamber 18 is located radially about midway between the axis of rotation 14 and the outer edge of the substrate 12.

A first waste reservoir 24a is located radially outward (i.e., further from the axis of rotation) of the sample chamber 18. The first waste reservoir 24a is connected to the sample chamber 18 via a first channel 22a. The first channel 22a forms a first capillary valve 23a. The first capillary valve 23a is designed to have a configuration, including its cross-section and radial position, such that it has a first burst frequency. As defined above, the first burst frequency is the maximum angular velocity of the substrate at which the first capillary valve 23a will block the flow of media from flowing from the sample chamber 18 through the first channel 22a, and when the substrate is rotating at an angular velocity above the first burst frequency, the first capillary valve 23a allows media to flow from the sample chamber 18 through the first channel 22a/first capillary valve 23a into the first waste reservoir 24a. The physical models describing the dependence of the bursting of a capillary valve on the valve cross-section, position, and angular velocity (called burst frequency) of the spinning platform have been previously described in the literature. See, e.g., Thio, G. et al., "Theoretical Development and Critical Analysis of Burst Frequency Equations for Passive Valves on Centrifugal Microfluidic Platforms", Medical & Biological Engineering & Computing (2013), which is incorporated by reference herein in its entirety. A vent 26a is in fluid communication with the first waste reservoir 24a at the radially inward side of the first waste reservoir 24a. The vent 26a comprises a vent channel and a vent hole at the end of the vent channel opposite the connection to the first waste reservoir 24a.

In order to prevent unwanted media from transferring from the sample chamber 18 into the first waste reservoir 24a (e.g., a first media loaded into the first media reservoir 24b), the volume of the first waste reservoir 24a is substantially equal to an expected volume of initial media to be introduced in the sample chamber 18. Alternatively, the volume of the first waste reservoir 24a may be substantially the same as the volume of the sample chamber 18. In terms of volumes of chambers, the term "substantially equal" or "substantially the same" means within 15%. Balancing the volume of the first waste reservoir 24a with a volume of initial media in the sample chamber, or with the volume of the sample chamber 18, provides that once the initial media is transferred from the sample chamber 18 into the first waste reservoir 24a by rotating the substrate 12 at an angular velocity exceeding the first burst frequency, the first waste reservoir 24a will be substantially full. Thus, when the substrate 12 is rotated at the higher angular velocities exceeding the second burst frequency, third burst frequency and fourth burst frequency, media cannot flow from the sample chamber 18 into the first waste reservoir 24a. For instance, at an angular velocity of the substrate 12 exceeding the second burst frequency, a first media a flowing from the first media reservoir 24b into the sample chamber 18 cannot flow into the first waste reservoir 24a because it is already full, or only a small amount of media in the sample chamber 18 can flow into the first waste reservoir 24a until it is completely full.

The media exchange module 16 also comprises a first media reservoir 24b which is located radially inward (i.e., closer to the axis of rotation) of the sample chamber 18 and which is connected to the sample chamber 18 via a second channel 22b. The second channel 22b forms a second capillary valve 23b. The second capillary valve 23b has a second burst frequency which is greater than the first burst frequency of the first capillary valve 23a. In this way, when the substrate 12 is rotated at an angular velocity which is greater than the first burst frequency but less than the second burst frequency, the first capillary valve 23a will open, thereby allowing media to flow out of the sample chamber 18 through the first channel 22a into the first waste reservoir 24a, while the second capillary valve 23b continues to seal the second channel 22b thereby preventing media from flowing out of the first media reservoir 24b. A vent 26b is in fluid communication with the first media reservoir 24b at the radially inward side of the first media reservoir 24b. The vent 26b comprises a vent channel and a vent hole at the end of the vent channel opposite the connection to the first media reservoir 24b. The first media reservoir 24b may also have an inlet port 20b for loading a first media into the first media reservoir 24b.

The media exchange module 16 also has a second waste reservoir 24c located radially outward of the sample chamber 18. The second waste reservoir 24c is connected to the sample chamber 18 via a third channel 22c. The third channel 22c forms a third capillary valve 23c having a third burst frequency which is greater than the second burst frequency. Similar to the relationship of the first and second burst frequencies, when the substrate 12 is rotated at an angular velocity which is greater than the second burst frequency but less than the third burst frequency, the second capillary valve 23b will open, thereby allowing a first media to flow out of the first media reservoir 24b through the second channel 22b into the sample chamber 18, while the third capillary valve 23c continues to seal the third channel 22c thereby preventing media from flowing out of the sample chamber 18 through the third channel 22c and into the second waste reservoir 24c. A vent 26c is in fluid communication with the second waste reservoir 24c at the radially inward side of the second waste reservoir 24c. The vent 26c comprises a vent channel and a vent hole at the end of the vent channel opposite the connection to the second waste reservoir 24c.

In order to prevent unwanted media from transferring from the sample chamber 18 into the second waste reservoir 24c, the volume of the second waste reservoir 24c is substantially equal to an expected volume of first media to be introduced into the sample chamber 18 from the first media reservoir 24b. Alternatively, the volume of the second waste reservoir 24c may be substantially the same as the volume of the first media reservoir 24b. Balancing the volume of the second waste reservoir 24c with a volume of first media to be loaded into the sample chamber 18, or with the volume of the sample chamber 18, provides that once the first media is transferred from the sample chamber 18 into the second waste reservoir 24c by rotating the substrate 12 at an angular velocity exceeding the third burst frequency, the second waste reservoir 24c will be substantially full. Thus, when the substrate 12 is rotated at the higher angular velocity exceeding the fourth burst frequency, the media in the sample chamber 18 cannot flow into the second waste reservoir 24c because it is already full, or only a small amount of media in the sample chamber 18 can flow into the second waste reservoir 24c until it is completely full.

In addition, the media exchange module 16 has a second media reservoir 24d located radially inward of the sample chamber 18. The second media reservoir 24d is connected to the sample chamber 18 via a fourth channel 22d. The fourth channel 22d forms a fourth capillary valve 23d having a fourth burst frequency which is greater than the third burst frequency. As with the other burst frequency relationships, when the substrate 12 is rotated at an angular velocity which is greater than the third burst frequency but less than the fourth burst frequency, the third capillary valve 23c will open, thereby allowing media to flow out of the sample chamber 18 through the third channel 22c into the second waste reservoir 24c, while the fourth capillary valve 23d continues to seal the fourth channel 22d thereby preventing media from flowing out of the second media reservoir 24d through the fourth channel 22d and into the sample chamber 18. In turn, when the substrate 12 is rotated at an angular velocity which is greater than the fourth burst frequency, the fourth capillary valve 23d opens, thereby allowing a second media to flow out of the second media reservoir 24d through the fourth channel 22d and into the sample chamber 18. The second media reservoir 24d may also have an inlet port 20d for loading a second media into the second media reservoir 24d. A vent 26d is in fluid communication with the second media reservoir 24d at the radially inward side of the second media reservoir 24d. The vent 26d comprises a vent channel and a vent hole at the end of the vent channel opposite the connection to the second media reservoir 24d.

For use with cells or other small material to be place in the sample chamber 18, the sample chamber 18 may be configured to hold a cell sample within the sample chamber 18 during transfers of media to and from the sample chamber 18. For example, the sample chamber 18 may include screens or perforated walls covering one or more of the outlets of the sample chamber 18 or the sample chamber may have a sample retainer or cell retainer 28.

As can be seen in FIGS. 1 and 2, the media exchange module 16 of the microfluidic device 10 is arranged in an "X" configuration. The first media reservoir 24b and second media reservoir 24d are located at substantially the same radial distance from the axis of rotation 14 (radially inward of the sample chamber) and adjacent to each other. The first waste reservoir 24a and second waste reservoir 24c are located at substantially the same radial distance from the axis of rotation 14 (radially outward of the sample chamber) and adjacent to each other. The sample chamber 18 is located at the intersection of the "X" formed by the reservoirs 24 between the first media reservoir 24b and second media reservoir 24d on the radially inward side of the sample chamber 18, and the first waste reservoir 24a and second waste reservoir 24c on the radially outward side of the sample chamber 18. This "X" configuration provides a very efficient use of space on the substrate 12, and a highly functional design.

Figure 3:
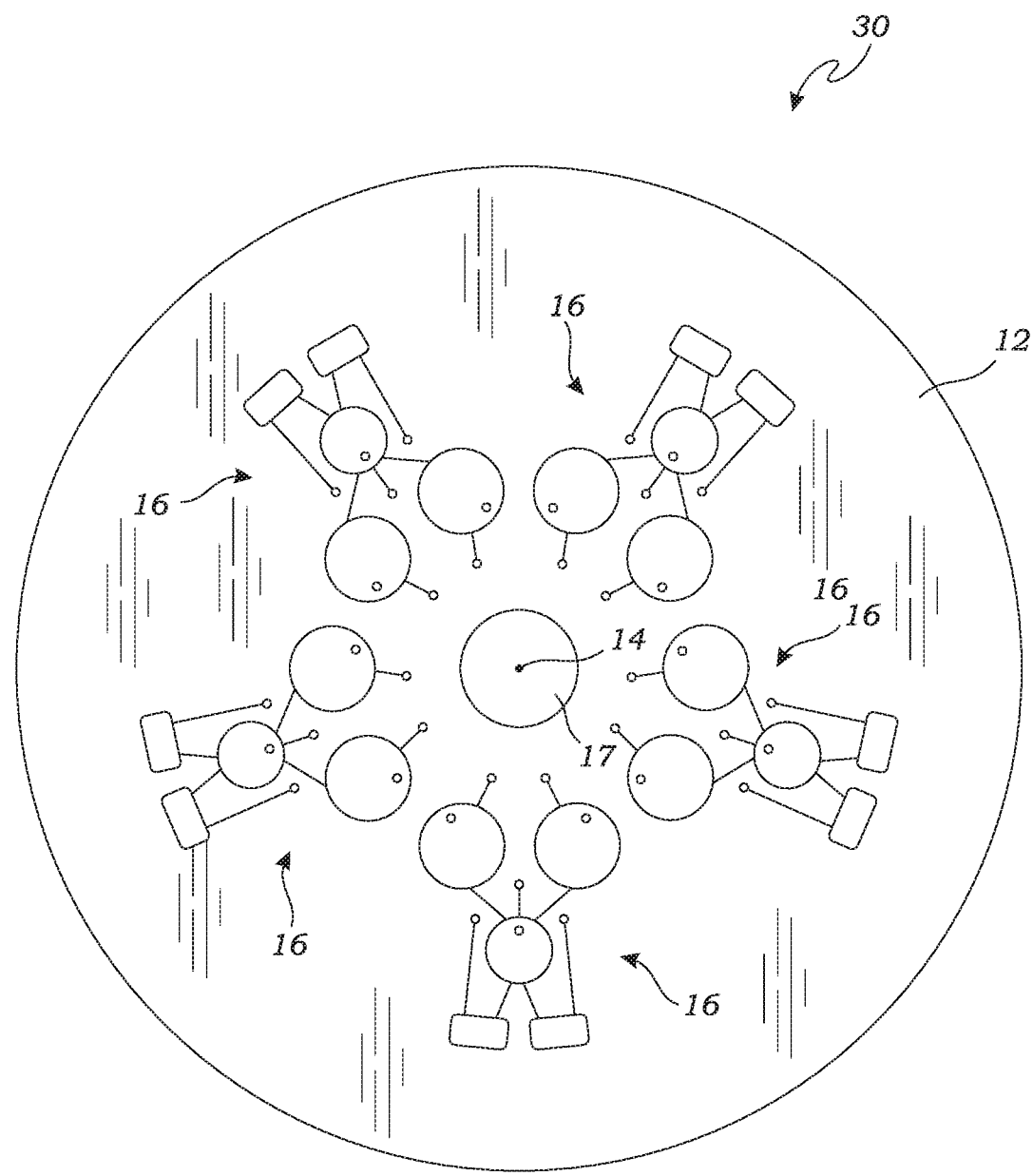
FIG. 3 is a plan view of a substrate having a plurality of media exchange modules formed therein, according to another embodiment of the present invention.

Turning to FIG. 3, in another embodiment of a microfluidic device 30, the substrate 12 comprises a plurality of the media exchange modules 16. Each of the media exchange modules 16 includes all of the features described above with respect to the media exchange module 16 shown in FIGS. 1 and 2. The media exchange modules 16 are angularly spaced apart about the substrate 12. In the exemplary embodiment of FIG. 3, the substrate 12 has five media exchange modules 16 in which the centerline of each media exchange module is angular spaced apart from the adjacent media exchange modules 16 by 72 degrees (360 degrees divided by the number of media exchange modules 16). In alternative embodiments, the substrate 12 may have from 2-10, or even more media exchange modules 16, which are angularly spaced apart by 360 degrees divided by the number of media exchange modules 16.

Figure 4:
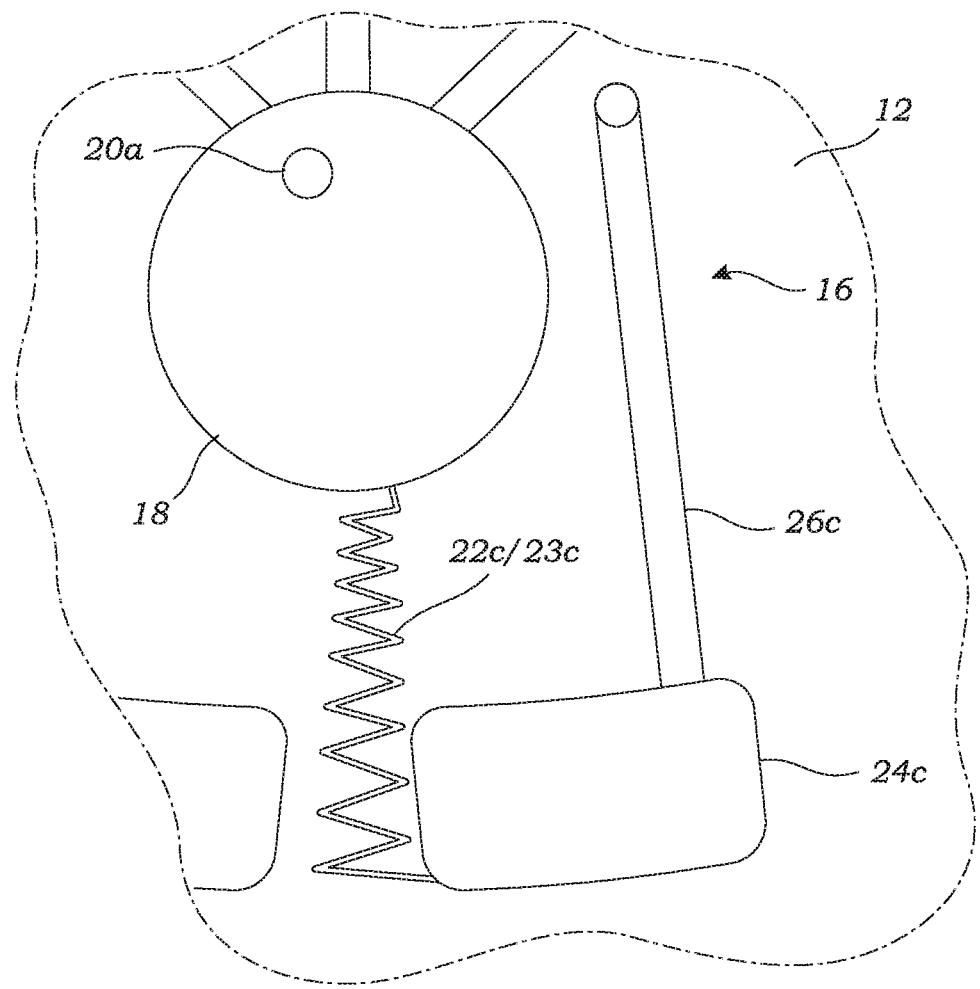
FIG. 4 is an enlarged, plan view of the substrate of FIG. 1 having a media exchange module including a zigzag channel, according to one embodiment of the present invention.

Turning now to FIG. 4, an enlarged view of a portion of a media exchange module 16 is illustrated which shows an alternative embodiment for one or more of the channels 22 and capillary valves 23 which allows the flow rate of media to be controlled. It may be desirable to control the rate of the flow of media through the sample chamber 18 (e.g., when the sample is cells and it is desirable to control the rate of flow of media across the cells). The flow rate can be controlled by configuring the cross-section, position and length of the channels 22 leading to and/or from the sample chamber 18. A well-known equation [1] predicts the flow rate Q through a channel on a rotating platform, such as the channels 22 on the rotating substrate 12:

$$Q = U \cdot A = \frac{D_h^2 \cdot \rho \cdot \omega^2 \cdot \bar{r} \cdot \Delta r \cdot A}{32 \cdot \mu \cdot L}, \quad [1]$$

where U is fluid velocity [m/s], $\rho$ is fluid density [kg/m$^3$], $\omega$ is angular velocity [rad/sec], $\mu$ is fluid dynamic viscosity [Pa·sec], L is the length of the channel, r bar is the average radial distance of the fluid column from the center, $\Delta r$ is the height of the fluid column, $D_h$ is the hydraulic diameter of the channel equal to 4A/P where A is the cross-section of the channel and P is the wetted perimeter of the channel.

As an example, FIG. 4 shows the third channel 22c as having a zigzag path to increase the length of the channel 22c, which results in reducing the flow rate through the channel 22c at a given angular velocity of the substrate 12. Any one or more of the first channel 22a, second channel 22b, third channel 22c, and fourth channel 22d may extend in a zigzag path having a plurality of acute angled direction changes, such as at least 5 zigzags or at least 7 zigzags, or at least 10 zigzags, or more.

Figure 5:
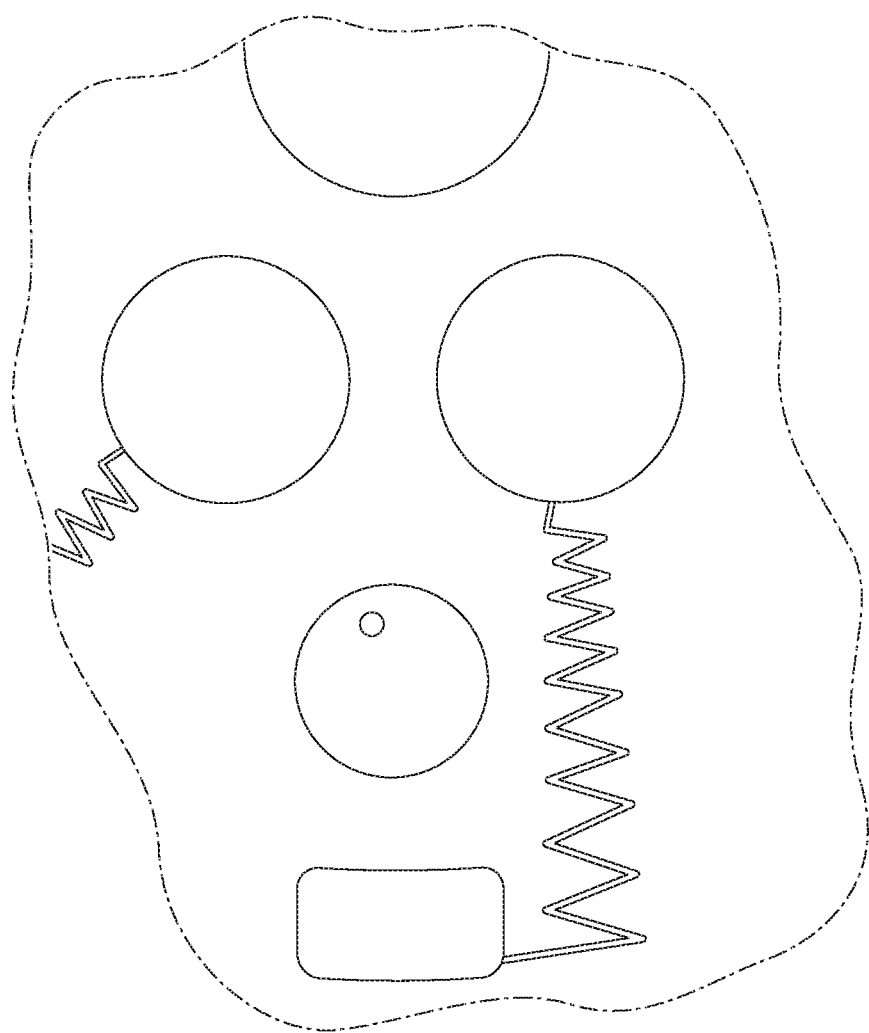
FIG. 5 is an enlarged, plan view of a substrate having a media exchange module including a zigzag channel, according to one embodiment of the present invention.

As one specific example of a zigzag channel design, in a zigzag (or snake) channel having a width of 120 microns and a depth of approximately 50 microns as shown in FIG. 5, a flow rate of less than 15 microliters per hour was demonstrated at a substrate angular velocity of 300 rpm. If one attempts to create a slow flow through the channel, it is often required to spin the substrate at a low angular velocity. Thus, it is important to avoid creating a capillary valve at the entrance to the waste reservoir 24a and/or 24c at the outlet of the zigzag channel 22a and/or 22c (when the droplet is created, the flow stops and a higher angular velocity is required to burst the droplet). One distinctive feature of the flow control channel design is that it enters the second waste reservoir 24c at the bottom of the second waste reservoir 24c (i.e., at the radially outermost side of the waste reservoir 24c) and not at the top or on the side of the waste reservoir 24c. This location of the outlet of the third channel 22c into the waste reservoir 24c avoids the possibility of creating a droplet of media at the inlet to the second waste reservoir 24c. As soon as even a little of the media enters the second waste reservoir 24c, the inlet to the second waste reservoir 24c will be submerged below the media level in the second waste reservoir thus eliminating the possibility of creating a capillary valve at the inlet to the second waste reservoir 24c. Once the bottom capillary valve is burst and fluid has started to collect at the bottom of the second waste reservoir 24c a capillary valve won't be created, and the angular velocity of the disc can be lowered since at this point there is no risk that the capillary valve will re-form and block the passage of the fluid. The first channel 22a may also be configured in a zigzag path similar to that shown for the third channel 22c in FIG. 4.

Figure 6:
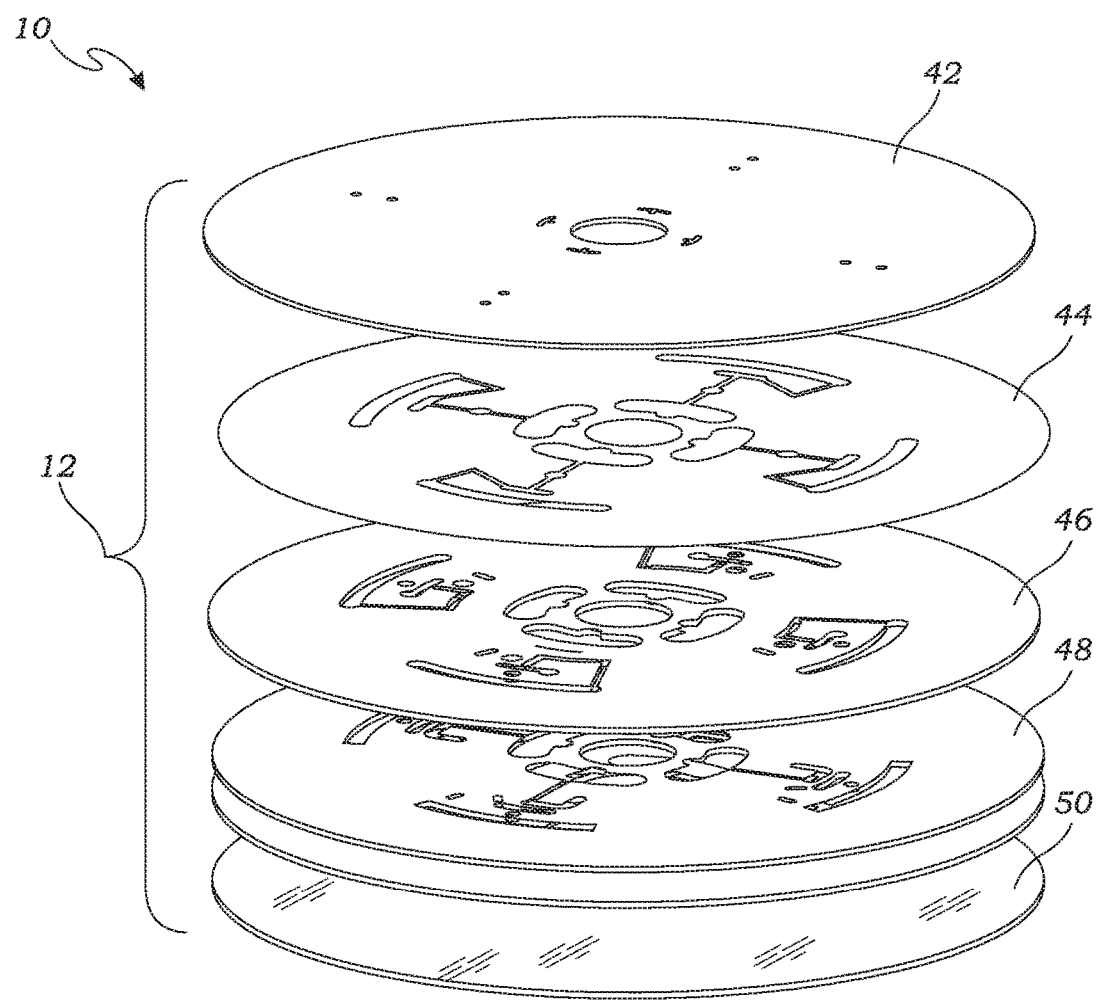
FIG. 6 is an exploded, perspective view showing the layers of a substrate having a media exchange module formed therein, according to one embodiment of the present invention.

As shown in FIG. 6, the substrate 12 may comprise a circular compact disc formed of a plurality of separate layers which form the microfluidic device 10 or 30. Accordingly, the substrate 12 can be fabricated as an assembly of multiple layers of discs that have microfluidic features milled into them, such as plastic discs, connected together by intermediate layers of double-sided adhesive films having microfluidic features cut into them. In the example of FIG. 6, the substrate 12 comprises a top disc 42 having inlet holes and vent holes which align with the inlets 20 and the vent holes of the vents 26 of the substrate 12. The top disc 42 may be formed of plastic or other suitable material and may be 1 mm thick or any other suitable thickness. A top adhesive layer 44 is made of a double-sided adhesive film and has one or more of the channels 22 cut into the adhesive layer 44. The top adhesive layer 44 may be 100 µm thick, or any other suitable thickness. A middle disc 46 has the reservoirs 24 formed in the disc, such as by milling or other suitable fabrication process (e.g., molding, etching, etc.). The middle disc 46 may be formed of plastic or other suitable material and may be 1 mm thick or any other suitable thickness. Next, a bottom adhesive layer 48 is made of a double-sided adhesive film and has one or more of the channels 22 cut into the adhesive layer 48. The bottom adhesive layer 44 may be 100 µm thick, or any other suitable thickness. In addition, the bottom adhesive layer 48 may be formed of 2 or more layers of double-sided adhesive film with channels 22 cut into the multiple layers in order to provide the desired depth of the channels 22. For instance, to obtain a channel 22 having a depth of 200 µm, two layers of 100 µm thick adhesive is used. Finally, a bottom disc 50 is provided as the bottom surface of the substrate 12. U.S. Patent Appn. Pubn. No. 2012-0295781, and Siegrist J et al. "Validation of a Centrifugal Microfluidic Sample Analysis and Homogenization Platform for Nucleic Acid Extraction with Clinical Samples", Lab on a Chip. 2010; 10:363-371, each disclose the fabrication of a compact disc substrate with a type of multiple layer disc construction, and are incorporated herein by reference in their entirety.

The use of the microfluidic devices 10 and 30 to perform a series of media exchanges with a sample contained in the sample chamber 18 will now be described—first a general use, and then for specific examples using cells. The following description of the method of use will describe using a single media exchange module 16 on a substrate 12, with the understanding that the same procedure may be used for each media exchange module 16 on a substrate having multiple media exchange modules 16, such as the substrate 12 for microfluidic device 30.

The substrate 12 is loaded with a sample and media to be exchanged with the sample. A sample is introduced into the sample chamber 18 through the inlet 20a. The sample may be one or more cells, or other subject matter to be contacted with media. A first media is introduced into the first media reservoir 24b through the inlet 20b and a second media is introduced into the second media reservoir 24*d* through the inlet 20*d*. Depending on the process being conducted, the substrate 12 may now be ready to use for media exchanges. In other processes, loading the substrate 12 may also include introducing an initial media into the sample chamber 18. In either case, the substrate 12 is now loaded and ready to perform the media exchanges.

The substrate 12 is mounted on a disc drive 62 (see FIG. 7) configured to retain the substrate and rotate the substrate 12 about its axis of rotation 14, as described in further detail below. The substrate 12 is rotated at a first angular velocity which is greater than the first burst frequency and less than the second burst frequency such that first capillary valve 23*a* opens allowing the initial media to flow out of the sample chamber 18 into the first waste reservoir 24*a* via the first channel 22*a*. The volume of initial media transferred from the sample chamber 18 to the first waste reservoir 24*a* is substantially equal to the volume of the first waste reservoir 24*a* such that the first waste reservoir 24*a* is completely filled or at least substantially completely filled.

Next, the substrate 12 is rotated at a second angular velocity which is greater than the second burst frequency and less than the third burst frequency such that the second capillary valve 23*b* opens and the first media flows from the first media reservoir 24*b* into the sample chamber 18 via the second channel 22*b*. The first waste reservoir 24*a* is substantially full so the first media does not flow out of the sample chamber 18 through the first channel 22*a* even though the second angular velocity is greater than the first burst frequency such that the first capillary valve 22*a* would allow flow through the valve 22*a*.

After transferring the first media into the sample chamber 18, the angular velocity of the substrate 12 may be reduced to significantly below the second angular velocity, even to zero (i.e., stopped) such that the substrate 12 is stationary, for a desired period of time while the sample in the sample chamber 18 is in contact with the first media.

Then, the substrate 12 is rotated at a third angular velocity which is greater than the third burst frequency and less than the fourth burst frequency such that the third capillary valve 23*c* opens and the first media flows from the sample chamber 18 into the second waste reservoir 24*c* via the third channel 22*c*. As described above, the first media will not flow through the first channel 22*a* into the first waste reservoir 24*a* because they are full. As with filling the first waste reservoir 24*a*, the volume of first media transferred from the sample chamber 18 to the second waste reservoir 24*c* is substantially equal to the volume of the second waste reservoir 24*c* such that the second waste reservoir 24*c* is completely filled or at least substantially completely filled.

Next, the substrate 12 is rotated at a fourth angular velocity which is greater than the fourth burst frequency such that the fourth capillary valve 23*d* opens and the second media flows from the second media reservoir 24*d* into the sample chamber 18 via the fourth channel 22*d*. Because the first waste reservoir 24*a* and second waste reservoir 24*c* are substantially full, the second media does not flow out of the sample chamber 18 through the first channel 22*a* or third channel 22*c* even though the fourth angular velocity is greater than both the first burst frequency and third burst frequency such that the first capillary valve 22*a* and third capillary valve 22*c* would allow flow through the respective valves.

After the second media is transferred into the sample chamber 18, the angular velocity of the substrate 12 may be reduced to significantly below the second angular velocity, even to zero (i.e., stopped) such that the substrate 12 is stationary, for a desired period of time while the sample in the sample chamber 18 is in contact with the second media.

The lower spin rate (i.e., angular velocity) of the substrate 12 also prevents media from escaping the first waste reservoir 24*a* and second waste reservoir 24*c* because the respective capillary valves 22*a* and 22*c* block flow through the respective channels 22*a* and 22*c* against the centrifugal forces at spin rates below the first burst frequency and third burst frequency. This completes the method of using the microfluidic device 10 and 30.

A method of using the microfluidic device 10 and 30 to perform a series of media exchanges with a sample of biological cells comprising embryos for a cell growth process will now be described. The first media reservoir 24*b* is loaded with cleavage media, the second media reservoir 24*d* is loaded with blastocyst media, and embryos are loaded into the sample chamber 18, as described above. Fertilization media, as the initial media, is loaded into the sample chamber 18 such that it is placed together with the embryos. The embryos and fertilization media can be loaded together at one time, or they can be loaded separately. The volume of fertilization media is substantially equal to the volume of the first waste reservoir 24*a*, in this case about 30 microliters, but this can vary depending on the specific design of the microfluidic device 10 or 30. During the period of time that the embryo cells are required to stay in the fertilization media (i.e., the initial media), the substrate 12 can remain stationary or be spun at a very slow rate (for example, 200 rotations per minute ("rpm")). After 18 hours (or the desired residence time for the cells in the initial media), the substrate 12 is mounted on a disc drive 62 (see FIG. 7) and is rotated at an angular velocity exceeding the first burst frequency such that the initial media flows into the first waste reservoir 24*a*, substantially filling the entire volume of the first waste reservoir 24*a*. The substrate 12 is then spun at an angular velocity exceeding the second burst frequency such that the cleavage media (i.e., the first media) flows out of the first media reservoir 24*b* into the sample chamber 18. Again, during the time that the embryos are required to stay in the cleavage media, the substrate 12 may be stationary or spun at a very slow rate (for example, 200 rpm). After the embryos are in the cleavage media for 18-24 hours (or other desired time period), the substrate 12 is spun at an angular velocity exceeding the third burst frequency such that the cleavage media flows out of the sample chamber 18 and into the second waste reservoir 24*c* substantially filling the entire volume of the second waste reservoir 24*c*. Then, after removing the cleavage media from the sample chamber 18, the substrate 12 is spun at an angular velocity exceeding the fourth burst frequency such that the blastocyst media flows out of the second media reservoir 24*d* into the sample chamber 18. Again, during the time that the embryos are required to stay in the blastocyst media, the substrate 12 may be stationary or spun at a very slow rate (for example, 200 rpm). After several days (or other desired period of time), the embryos have completed their in-vitro cycle.

In one particular embodiment of a microfluidic device 10 or 30 according to the present invention, the channels 22 and capillary burst frequencies may be as follows: first channel 22*a* is 1000 microns wide, 200 microns deep; second channel 22*b* is 2000 microns wide, 200 microns deep; third channel 22*c* is 400 microns wide, 200 microns deep; and fourth channel 22*d* is 600 microns wide, 200 microns deep. The automation of the media exchanges is executed when the following sequence of the angular velocity is followed: A) the first burst frequency is 450 rpm such that when the substrate 12 is spun at or above 450 rpm, the fertilization media flows from the sample chamber 18 into the first waste reservoir 24a; B) the second burst frequency is 480 rpm such that when the substrate 12 is spun at or above 480 rpm, the cleavage media flows from the first media reservoir 24b into the sample chamber 18; C) the third burst frequency is 550 rpm such that when the substrate is spun at or above 550 rpm, the cleavage media flows from the sample chamber 18 into the second waster reservoir 24c; and D) the fourth burst frequency is 620 rpm such that when the substrate 12 is spun at or above 620 rpm, the blastocyst media flows from the second media reservoir 24d into the sample chamber 18.

Figure 7:
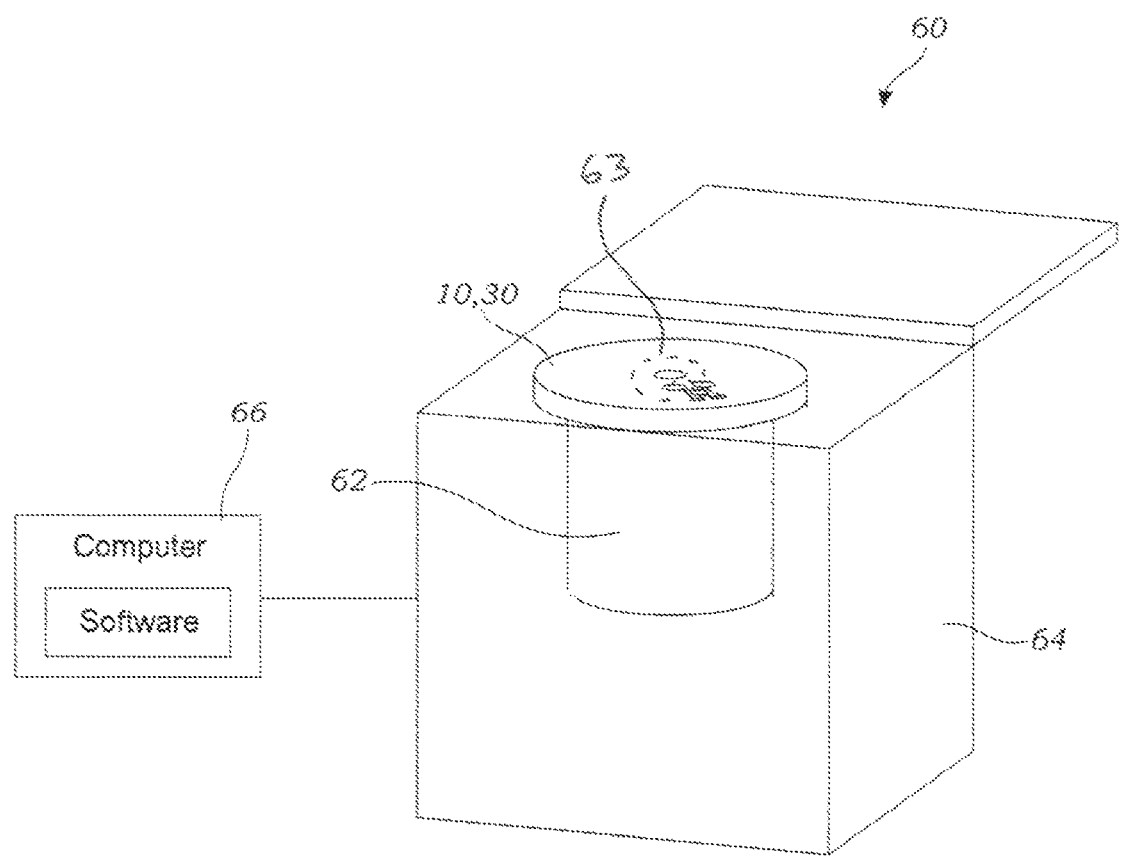
FIG. 7 illustrates a schematic of a microfluidic system having an incubator integrated with a disc drive and microfluidic device, according to one embodiment of the present invention.

Turning to FIG. 7, a schematic of a microfluidic system 60 having an incubator 64 integrated with a disc drive 62 and having a microfluidic device 10 or 30 mounted on the disc drive 62. The disc drive 62 may comprise a support or platen 63 on which the substrate 12 of the microfluidic device 10 or 30 is mounted. The platen 63 is rotational about its central axis in either a clockwise or counter-clockwise direction. In one embodiment, the platen 63 may have a spindle that passes partially or completely through the hole 17 in the center of the substrate 12. The platen 63 may be connected to a motor or servo via a shaft that is used to drive the platen 63 and thus the substrate 12. The motor or servo may be a bi-directional such that platen 63 is able to spin in either the clockwise or counter-clockwise directions. In addition, the speed of the motor or servo is controllable such that the angular rotational frequency can be controlled. A computing device 66, such as a personal computer or other suitable computer having a processor, memory and software, is operably connected to the disc drive 62 and is programmed to control the rotational parameters (e.g., rotational speed, sequence, timing, etc.) of the disc drive 62. Thus, the computing device 66 may be programmed to control the rotation of the disc drive 62 in order to perform any of the processes in using the media exchanges using the microfluidic device 10 or 30, as described herein. The computing device 66 may also be operably connected to the incubator 64 such that it can control the operation of the incubator 64, including the temperature, humidity, etc. The computing device 66, incubator 64 and/or disc drive 62 may be separate components of the microfluidic system 60, or any one or more of the components may be integrated together. The incubator 64 may be a table top incubator (or portable incubator) of the size typically placed on a table top. For example, table top incubators are about one foot wide by one foot deep by one foot high, and have an incubation chamber slightly smaller than the overall dimensions, such as 10" long by 10" wide by 2"-3" deep. The entire substrate 12 is enclosed within the incubation chamber of the incubator 64, and the disc drive 62 may also be fully or partially enclosed within the incubator 64.

What is claimed is:

1. A microfluidic device, comprising:
   a substrate configured for rotation about an axis of rotation, the substrate having formed therein a media exchange module, the media exchange module comprising:
   a sample chamber having a cell retainer which retains one or more cells within the sample chamber during rotation of the substrate;
   a first waste reservoir located radially outward of the sample chamber and connected to the sample chamber via a first channel, the first channel forming a first capillary valve having a first burst frequency, the first waste reservoir having a volume substantially the same as a volume of the sample chamber;
   a first media reservoir located radially inward of the sample chamber and connected to the sample chamber via a second channel, the second channel forming a second capillary valve having a second burst frequency which is greater than the first burst frequency;
   a second waste reservoir located radially outward of the sample chamber and connected to the sample chamber via a third channel, the third channel forming a third capillary valve having a third burst frequency which is greater than the second burst frequency, the second waste reservoir having a volume substantially the same as a volume of the sample chamber and wherein the first waste chamber and the second waste chamber are located at substantially the same radial distance from the axis of rotation; and
   a second media reservoir located radially inward of the sample chamber and connected to the sample chamber via a fourth channel, the fourth channel forming a fourth capillary valve having a fourth burst frequency which is greater than the third burst frequency.

2. The microfluidic device of claim 1, wherein the media exchange module is in an "X" configuration such that the first media reservoir and second media reservoir are at substantially the same radial distance from the axis of rotation and adjacent to each other and the sample chamber is located between the first media reservoir, second media reservoir, first waste reservoir and second waste reservoir.

3. The microfluidic device of claim 1, wherein the substrate comprises a circular compact disc formed of a plurality of separate layers which form the microfluidic device.

4. The microfluidic device of claim 1, further comprising:
   a spin motor having a support for retaining the substrate, the spin motor configured to rotate the substrate about the axis of rotation at a controllable angular velocity; and
   a table top incubator which encloses the entire substrate.

5. The microfluidic device of claim 1, wherein the sample chamber is configured to hold a cell sample and to retain the cell sample in the sample chamber during transfers of media from the sample chamber to one or more of the first waste reservoir and the second waste reservoir.

6. The microfluidic device of claim 1, wherein the sample chamber comprises a cell retainer which retains one or more cells within the sample chamber during transfers of media from the sample chamber to one or more of the first waste reservoir and the second waste reservoir.

7. The microfluidic device of claim 6, wherein the cell retainer comprises a perforated wall within the sample chamber having a plurality of perforations which are smaller than the diameter of a cell to be placed in the sample chamber.

8. The microfluidic device of claim 7, wherein the plurality of perforations have a diameter of less than 100 μm.

9. The microfluidic device of claim 1, wherein the substrate comprises a plurality of the media exchange modules formed therein, the media exchange modules angularly spaced apart about the substrate.

10. The microfluidic device of claim 1, wherein one or more of the first channel, second channel, third channel, and fourth channel extend in a zigzag path having at least 5 acute angled direction changes.

11. A method of using a microfluidic device, comprising:
    providing a microfluidic device comprising:
    a substrate configured for rotation about an axis of rotation, the substrate having formed therein a media exchange module, the media exchange module comprising:

a sample chamber;
a first waste reservoir located radially outward of the sample chamber and connected to the sample chamber via a first channel, the first channel forming a first capillary valve having a first burst frequency;
a first media reservoir located radially inward of the sample chamber and connected to the sample chamber via a second channel, the second channel forming a second capillary valve having a second burst frequency which is greater than the first burst frequency;
a second waste reservoir located radially outward of the sample chamber and connected to the sample chamber via a third channel, the third channel forming a third capillary valve having a third burst frequency which is greater than the second burst frequency; and
a second media reservoir located radially inward of the sample chamber and connected to the sample chamber via a fourth channel, the fourth channel forming a fourth capillary valve having a fourth burst frequency which is greater than the third burst frequency;
introducing a sample into the sample chamber;
introducing an initial media into the sample chamber;
introducing a first media into the first media reservoir;
introducing a second media into the second media reservoir;
rotating the substrate about the axis of rotation at a first angular velocity which is greater than the first burst frequency and less than the second burst frequency such that the initial media flows from the sample chamber into the first waste reservoir via the first channel;
rotating the substrate about the axis of rotation at a second angular velocity which is greater than the second burst frequency and less than the third burst frequency such that the first media flows from the first media reservoir into the sample chamber via the second channel;
rotating the substrate about the axis of rotation at a third angular velocity which is greater than the third burst frequency and less than the fourth burst frequency such that the first media flows from the sample chamber into the second waste reservoir via the third channel; and
rotating the substrate about the axis of rotation at a fourth angular velocity which is greater than the fourth burst frequency such that the second media flows from the second media reservoir into the sample chamber via the fourth channel.

12. The method of claim 11, further comprising:
after rotating the substrate about the axis of rotation at a second angular velocity and flowing the first media into the sample chamber, reducing the angular velocity of the substrate to significantly below the second angular velocity while the sample is in contact with the first media for a predetermined period of time.

13. The method of claim 12, further comprising:
after rotating the substrate about the axis of rotation at a fourth angular velocity and flowing the second media into the sample chamber, reducing the angular velocity of the substrate to significantly below the fourth angular velocity while the sample is in contact with the second media for a predetermined period of time.

14. The method of claim 11, wherein:
the volume of the initial media flowing into the first waste reservoir substantially fills an entire volume of the first waste reservoir.

15. The method of claim 11, wherein the media exchange module is in an "X" configuration such that the first media reservoir and second media reservoir are at substantially the same radial distance from the axis of rotation and adjacent to each other and the first waste reservoir and second waste reservoir are at substantially the same radial distance from the axis of rotation and adjacent to each other, and the sample chamber is located between the first media reservoir, second media reservoir, first waste reservoir and second waste reservoir.

16. The method of claim 11, wherein the substrate comprises a circular compact disc formed of a plurality of separate layers which form the microfluidic device.

17. The method of claim 11 wherein the microfluidic device further comprises:
a spin motor having a support for retaining the substrate, the spin motor configured to rotate the substrate about the axis of rotation at a controllable angular velocity; and
a table top incubator which encloses the entire substrate.

18. The method of claim 11, wherein:
the sample chamber is configured to hold a cell sample and to retain the cell sample in the sample chamber during transfers of media from the sample chamber to one or more of the first waste reservoir and the second waste reservoir; and
the sample comprises one or more cells.

19. The method of claim 11, wherein
the sample comprises one or more cells; and
the sample chamber comprises a cell retainer which retains the one or more cells within the sample chamber during the transfer of the initial media from the sample chamber to the first waste reservoir and the transfer of the first media from the sample chamber to the second waste reservoir.

20. The method of claim 19, wherein the cell retainer comprises a perforated wall within the sample chamber having a plurality of perforations which are smaller than the diameter of a cell to be placed in the sample chamber.

21. The method of claim 20, wherein the plurality of perforations have a diameter of less than 100 μm.

22. The method of claim 11, wherein the substrate comprises a plurality of the media exchange modules formed therein, the media exchange modules angularly spaced apart about the substrate.

23. The method of claim 11, wherein one or more of the first channel, second channel, third channel, and fourth channel extend in a zigzag path having at least 5 acute angled direction changes.

* * * * *